(12) United States Patent
Basir et al.

(10) Patent No.: US 10,349,355 B2
(45) Date of Patent: Jul. 9, 2019

(54) CONTEXT-BASED MOBILITY ANALYSIS AND RECOGNITION

(71) Applicant: IMS SOLUTIONS, INC., Schaumburg, IL (US)

(72) Inventors: Otman A Basir, Waterloo (CA); William Ben Miners, Guelph (CA); Akrem Saad El-Ghazal, Waterloo (CA)

(73) Assignee: Appy Risk Technologies Limited, Cheshire (GB)

( * ) Notice: Subject to any disclaimer, the term of this patent is extended or adjusted under 35 U.S.C. 154(b) by 0 days.

(21) Appl. No.: 14/556,807

(22) Filed: Dec. 1, 2014

(65) Prior Publication Data

US 2015/0156725 A1   Jun. 4, 2015

Related U.S. Application Data

(60) Provisional application No. 61/910,215, filed on Nov. 29, 2013.

(51) Int. Cl.
*H04M 1/73* (2006.01)
*H04W 52/02* (2009.01)
*G01P 15/02* (2013.01)

(52) U.S. Cl.
CPC ......... *H04W 52/0254* (2013.01); *G01P 15/02* (2013.01); *H04M 1/73* (2013.01); *Y02D 70/142* (2018.01); *Y02D 70/164* (2018.01)

(58) Field of Classification Search
CPC ............ A63B 2220/30; A63B 69/0028; A63B 2220/40; A63B 2024/0025; A63B 2220/62; A63B 2220/836; A63B 24/0003; A63B 24/0021; H04W 4/027; H04W 4/02; H04W 52/0251; H04W 4/12; H04W 36/32; H04W 52/0254
USPC ......................................................... 455/574
See application file for complete search history.

(56) References Cited

U.S. PATENT DOCUMENTS

| 9,305,317 | B2 | 4/2016 | Grokop et al. | |
| 2004/0212494 | A1* | 10/2004 | Stilp | G05B 9/03 340/539.1 |
| 2011/0228753 | A1 | 9/2011 | Polito et al. | |
| 2012/0146848 | A1* | 6/2012 | Ezer et al. | 342/357.25 |
| 2013/0137450 | A1 | 5/2013 | Dai et al. | |
| 2013/0307722 | A1* | 11/2013 | Rezaei | 342/357.2 |

OTHER PUBLICATIONS

International Search Report and Written Opinion for PCT Application No. PCT/US2014/067916, dated Feb. 20, 2015.

* cited by examiner

*Primary Examiner* — Kwasi Karikari
(74) *Attorney, Agent, or Firm* — Carlson, Gaskey & Olds, P.C.

(57) ABSTRACT

A mobile device includes an inertial sensor generating inertia signals based upon motion of the mobile device. The mobile device further includes a high power module that consumes more power than the inertial sensor. A processor is programmed to determine whether the mobile device is being carried by a user who is walking based upon the inertia signals. The processor deactivates the high power module or maintains the high power module in a low power mode based upon a determination that the mobile device is being carried by a user who is walking.

13 Claims, 6 Drawing Sheets

CONTEXT-BASED MOBILITY ANALYSIS AND RECOGNITION

BACKGROUND

Modern telemetric mobile-based technologies typically rely on data provided by power-demanding modules (e.g. the built-in GPS) to facilitate the car/driver localization process. One of the main issues with this approach is the consequent high power consumption of the system, which if not managed properly can result in a significant reduction of the battery lifetime. Users have to manually start/shut down the telematics application to avoid the aforementioned problem.

SUMMARY

An efficient telematics device (e.g. cell phone) deploys the power-efficient accelerometer module available in most modern cell phones today to analyze and identify the activity context (state) of a mobile user and activates the power-demanding modules only if the user is determined to be in need of the location information, e.g. in the driving state. This enables a more efficient deployment of the telematics systems and hence extends the battery lifetime of the host platform without the need for the user intervention.

The disclosed method supports the recognition of four user states, namely, walking, stopped, halted, and driving. The method deploys a state-machine architecture to keep track of the user state/activity. To effectively and efficiently track the user state the method mainly relies on a power-efficient module (e.g. accelerometer) to identify the walking state of the user. The power-demanding modules (e.g. GPS) are used only if the user is in activity that requires them. This method requires very little power to operate and is thus can run in the background and control the starting and shutdown of the power demanding modules according to the detected user state The relevant walking features are extracted from both the time, as well as frequency domain signals of the accelerometer. These features are integrated together in order to come up with the state of the user. The fusion process improves the reliability and robustness of detecting the user walking state.

This disclosure provides a system to automatically detect one or more human activities. The system automatically classifies one or more human activities. Measurements may be obtained from one or more mobile devices. Measurements may be obtained from one or more external sensors. Measurements may be obtained from one or more body-attached or internal sensors.

As an example, human activity of walking may be detected. As another example, the human activity of standing may be detected. The human activity of sitting may be detected. The human activity of driving may be detected. The human may be identified as being either a driver or a passenger. The human activities of riding on a bus, train, or subway may be detected. The system may dynamically select the appropriate data sources to detect human activity based on power consumption. The system may select a method to detect human activity based on power consumption.

The system may use power consumption patterns to detect or classify human activity. The system may manage power consumption based on human activity.

The system may prioritize activation and operation of tasks based on power consumption patterns, and if needed, terminate lower priority tasks to prolong the ability of the system to operate high priority tasks. Historical power consumption patterns may be used. Current power consumption patterns may be used. The system may adapt data collection frequency based on recent human activity.

Cues of human activity may be obtained from nearby wireless sources. Cues of human activity may be obtained from in-vehicle presence detection.

These and other features of the invention can be best understood from the following specification and drawings.

DETAILED DESCRIPTION OF THE PREFERRED EMBODIMENT

Figure 1:
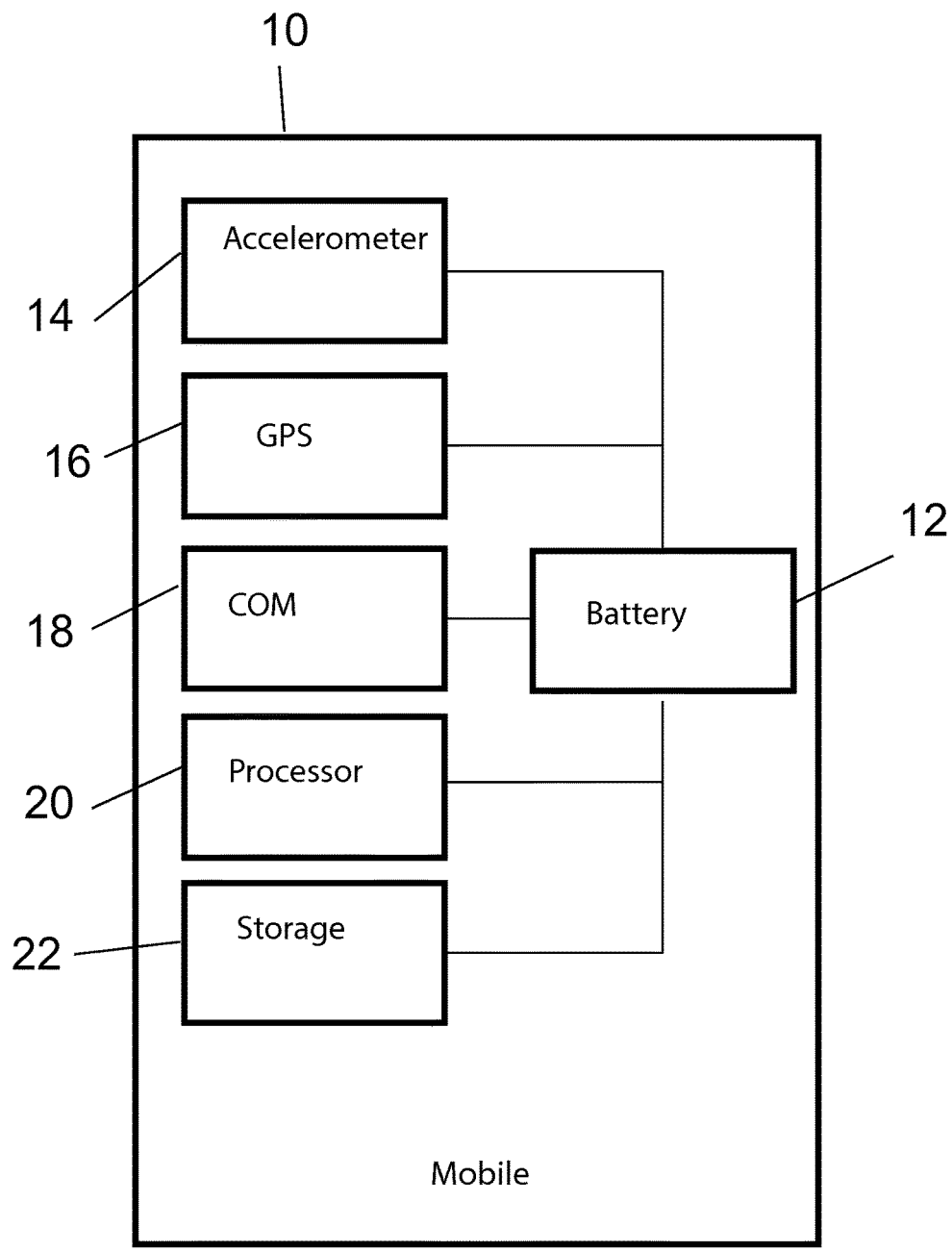
FIG. 1 schematically illustrates a mobile device according to one embodiment.

FIG. 1 schematically illustrates a mobile device 10 according to one embodiment. The mobile device 10 (such as a cell phone) includes a battery 12 power a plurality of onboard devices, such as an inertial sensor 14, such as an accelerometer (which could be a three-axis accelerometer, or alternatively or additionally, the inertial sensor could be one or more gyros), a GPS receiver 16, communication circuitry 18 (such as the cell communication circuitry, Bluetooh, wifi, etc), at least one processor 20 programmed to perform the functions described herein and storage 22 accessible by the processor 20 and storing (among other things) the programming to perform the functions described herein.

Optionally, the mobile device 10 may include a magnetometer which could be used to detect whether the mobile device 10 is currently inside a vehicle (the magnetometer can detect the "metal cage" of the vehicle vs open sky). This information (inside vehicle/outside vehicle) can also be used as criteria in transitions and whether to change states (e.g. from stopped to driving (going into a vehicle) and from driving to halted (exiting the vehicle).

State Recognition Method

Figure 2:
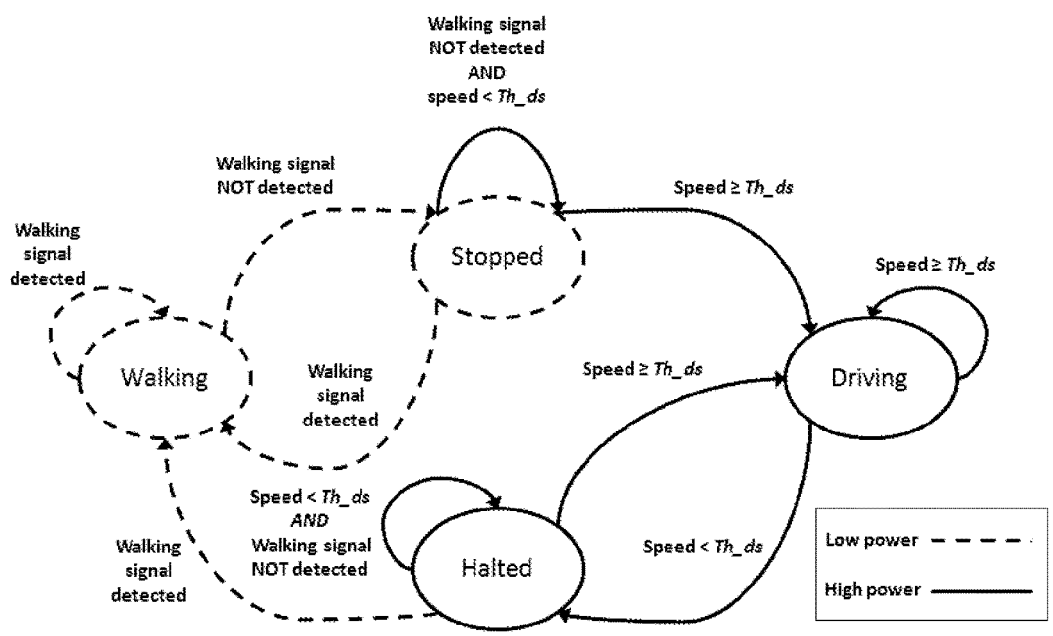
FIG. 2 schematically illustrates the state representation across user activities.

FIG. 2 shows a state-machine representing the four main states of the user distinguished by the disclosed method, namely, walking, stopped, halted, and driving along with the ten relevant state transitions. The states and transitions are performed by the processor 20 on the mobile device 10.

There are ten transitions in the state-machine of FIG. 2. Four transitions (shown in dashed line) are minimum power transitions and do not rely on power demanding module (e.g. they do not need gps receiver 16 and can be performed based upon inertial sensors 14). The remaining six transitions (shown in solid line) are high power transitions (e.g. the transitions depend on the gps receiver 16, possibly in addition to the inertial sensors 14). The walking and stopped states are both low power states, in which the power-demanding modules (e.g. gps receiver 16) may be switched off but the inertial sensors 14 remain on for the minimum power transitions. Accordingly, the disclosed method yields significant power saving for the users identified to be in the walking or stopped state.

Other optional high power modules (in addition or instead of gps receiver 16) or activities include triangulation using the cellular signal and wifi. Optionally, these could be deactivated in the minimum power states. Note that even in the minimum power states the high power module(s) may periodically switch on. For example, the gps receiver 16 may switch on periodically to scan.

The following details the state transitions involved:
1) Walking→Walking: if the walking signal is continuously detected indicating a walking user the system remains in the walking state.
2) Walking→Stopped: once the walking signal is not detected the user has to stop first before any further changes, thus system state is changed to stopped.
3) Stopped→Walking: if the walking signal is detected again while at stopped state, the system state is restored to walking.
4) Stopped→Stopped: while at the stopped state, if the walking signal is not detected and the estimated speed is below the predefined threshold Th_ds the system remains in the stopped state. Since the user might remain in the stopped state for a long period of time, e.g. sitting at work, the method only checks for the speed, requiring the GPS data, for a predetermined time interval T_stop before turning off the GPS.
5) Stopped→Driving: within the first T_stop seconds for being in the stopped state, if the estimated speed is above the predefined threshold Th_ds, the system state is changed to driving.
6) Driving→Driving: the estimated speed is above the predefined threshold Th_ds.
7) Driving→Halted: while at the driving state, if the speed estimate drops below the threshold Th_ds the system state is changed to halted, implying the drop in speed to be caused by a temporary stop (halt) situation.
8) Halted→Driving: while at the halted state the user speed is continuously estimated and the system state is restored to driving if the speed estimate is determined to be above the threshold Th_ds.
9) Halted→Halted: the system remains in the halted state as long as no walking signal is detected and the speed estimate the below the driving state threshold Th_ds.
10) Halted→Walking: while at the halted state, the system state is changed to walking as soon as the walking signal is detected.

It is important to note that estimating the user speed relies on the data from the GPS receiver 16. However, the speed is only required if the user is determined not to be in a walking state. Although only one speed threshold Th_ds is shown in FIG. 2 for comparison in several transitions, it is possible to use a different value for the threshold in each transition.

Walking Detection Method

Figure 3:
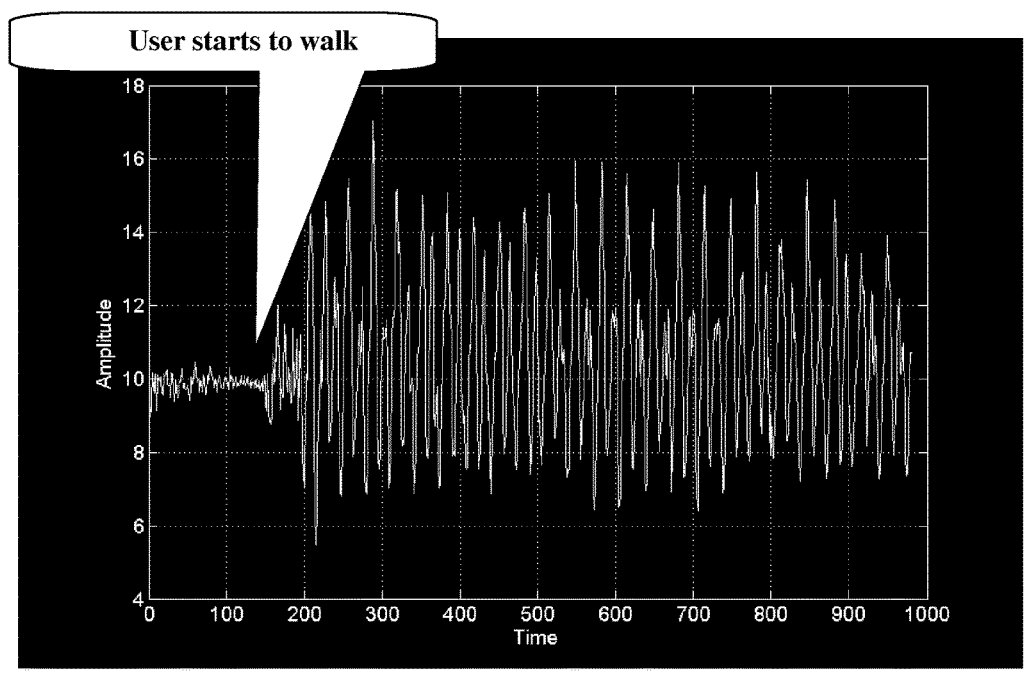
FIG. 3 schematically illustrates the time domain representation of acceleration during standing and walking activities.
Figure 4:
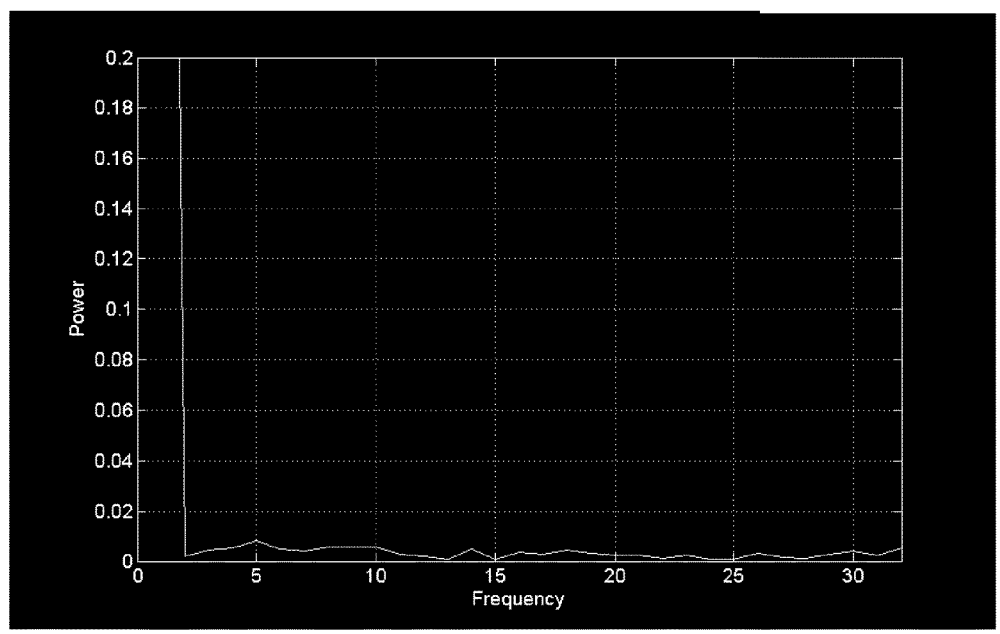
FIG. 4 schematically illustrates the frequency spectrum of the standing user.
Figure 5:
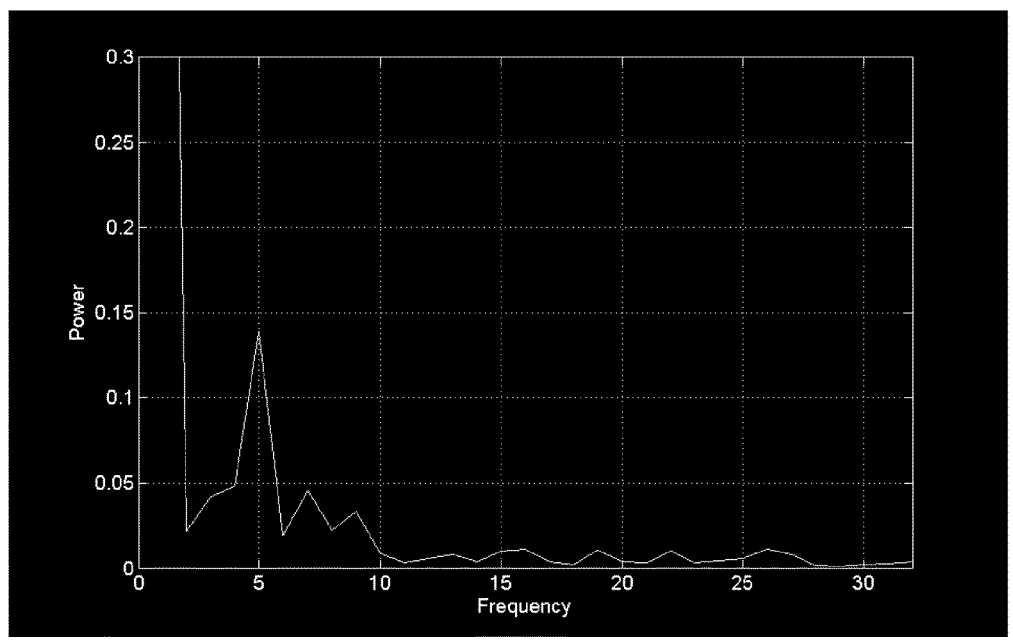
FIG. 5 schematically illustrates the frequency spectrum of the walking user.
Figure 6:
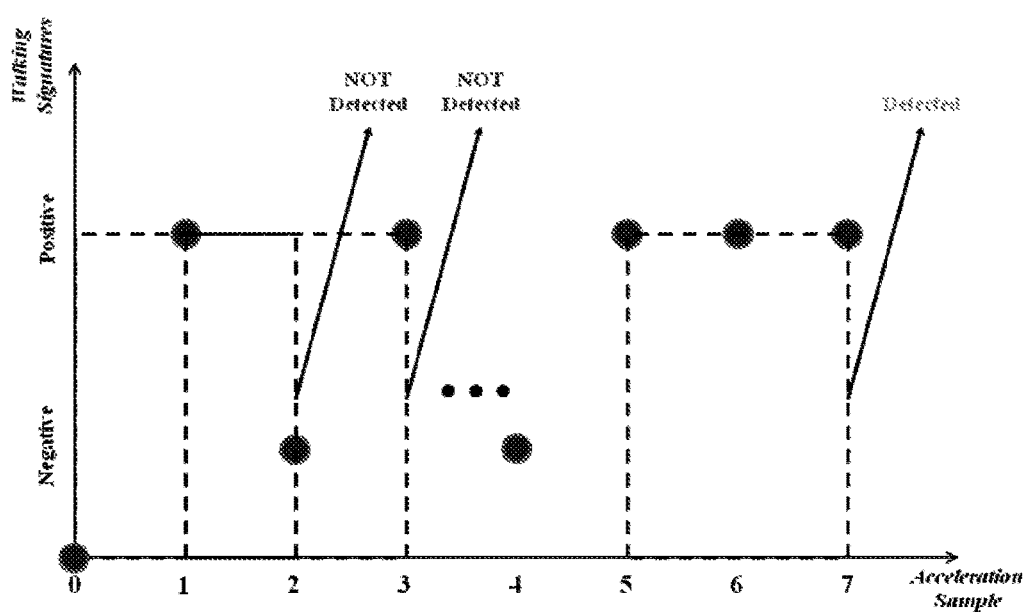
FIG. 6 schematically illustrates the sliding window based walking activity detection.

The walking features are extracted from the acceleration signals collected from inertial sensors 14 over a predefined period of time T_collect and sampled at the rate specified by R_as. FIGS. 3 to 5 depict an exemplary acceleration signal in the time and frequency domains, respectively, for a scenario where the user is initially standing still and then starts to walk. As shown in the FIG. 3, the walking behavior results in a noticeable increase in the variance of acceleration amplitude, which is considered as the time domain feature of the walking user. The corresponding frequency domain representations of the acceleration signal for the standing and walking portions of the FIG. 3 are also shown in the FIGS. 4 and 5, respectively. Comparing the two cases, it is clear that for the case of walking user there is an increase of power for a specific range of frequencies, which is considered as the frequency domain feature of the walking user. The processor 20 compares the amplitude of the particular frequency range (e.g. around 5 Hz, such as approximately 4 to approximately 10 Hz) to a threshold and/or compares the amplitude to the amplitudes at frequencies other than the particular frequency (e.g. higher than 10 Hz). Frequencies below 3 Hz are ignored. If the amplitude exceeds the threshold and/or the difference between the particular frequency and higher frequencies is above a second threshold, then the processor 20 determines that the user is walking FIG. 6 schematically illustrates an optional sliding window based walking activity detection. In this example, there must be a plurality (in this example, three) consecutive samples of the inertial sensors 14 that indicate walking in order to make the determination that there is currently a walking state. A walking state is not determined until there are three consecutive indications of walking (based upon three consecutive samples of the inertial sensors 14) before the state is changed (or confirmed) as walking.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A mobile device comprising:
an inertial sensor generating inertia signals;
a high power module, wherein the high power module consumes more power than the inertial sensor, wherein the high power module is a gps receiver;
a processor programmed to determine whether the mobile device is being carried by a user who is walking based upon the inertia signals, wherein the processor operates a state machine including a walking state based upon the determination that the user is walking, wherein the processor deactivates the high power module based upon being in the walking state, wherein the state machine includes a stopped state and a transition from the walking state to the stopped state based upon a determination that the user has stopped walking based upon the inertia signals, wherein the processor is programmed to analyze the inertia signals between 4 Hz and 10 Hz to determine whether the user is walking, wherein processor is programmed to activate the gps receiver periodically when in the stopped state and determines a current speed, wherein the state machine remains in the stopped state based upon a determination that the current speed is less than a speed threshold, wherein the state machine includes a transition from the stopped state to a driving state based upon a determination that the current speed is greater than the speed threshold, wherein the gps receiver is activated when the state machine is in the driving state, wherein the state machine includes a transition from the driving state to a halted state based upon a determination that the current speed has dropped below a driving speed threshold.

2. A method for operating a mobile device including the steps of:
a) determining whether the mobile device is being carried by a user who is walking based upon inertial signals reflecting motion of the mobile device between 4 Hz and 10 Hz, wherein the motion signals are generated by an inertial sensor;

b) operating with a processor a state machine, including entering a walking state based upon the determination that the mobile device is being carried by the user who is walking in said step a);

c) operating the mobile device in a low power mode based upon being in the walking state, said step of operating in the low power mode including deactivating a gps receiver;

d) transitioning from the walking state to a stopped state based upon a determination that the user has stopped walking based upon the inertia signals;

e) periodically activating the gps receiver when in the stopped state to determine a current speed;

f) maintaining the state machine in the stopped state based upon the current speed in said step e);

g) transitioning from the stopped state to a driving state based upon the current speed in said step e);

h) activating the gps receiver based upon said step g);

i) transitioning the state machine from the driving state to a halted state based upon a determination of the current speed after said step g).

3. The method of claim 2 wherein said step a) is performed based upon motion of the mobile device.

4. The method of claim 2 wherein the inertial sensor is an accelerometer.

5. The method of claim 2 wherein the halted state is distinct from the stopped state.

6. The method of claim 2 wherein the state machine can enter the halted state only from the driving state and wherein the state machine can enter the stopped state only from the walking state.

7. The method of claim 6 wherein said step a) further includes the step of comparing an amplitude of the inertial signals between 4 Hz and 10 Hz to amplitudes of frequencies outside of 4 Hz to 10 Hz to determine whether the mobile device is being carried by a user who is walking.

8. The mobile device of claim 1 wherein the halted state is distinct from the stopped state.

9. The mobile device of claim 1 wherein the state machine can enter the halted state only from the driving state and wherein the state machine can enter the stopped state only from the walking state.

10. A mobile device comprising:
an inertial sensor generating inertia signals;
a high power module, wherein the high power module consumes more power than the inertial sensor, wherein the high power module is a gps receiver;
a processor programmed to determine whether the mobile device is being carried by a user who is walking based upon the inertia signals, wherein the processor operates a state machine, the state machine including a walking state, a driving state, a stopped state and a halted state, wherein the state machine enters the walking state is based upon the determination that the user is walking, wherein the processor deactivates the high power module based upon being in the walking state, wherein the state machine includes a transition from the walking state to the stopped state based upon a determination that the user has stopped walking based upon the inertia signals, wherein processor is programmed to activate the gps receiver periodically when in the stopped state and determines a current speed, wherein the state machine remains in the stopped state based upon a determination that the current speed is less than a speed threshold, wherein the state machine includes a transition from the stopped state to a driving state based upon a determination that the current speed is greater than the speed threshold, wherein the gps receiver is activated when the state machine is in the driving state, wherein the state machine includes a transition from the driving state to the halted state based upon a determination that the current speed has dropped below a driving speed threshold.

11. The mobile device of claim 9 wherein the state machine can enter the halted state only from the driving state and wherein the state machine can enter the stopped state only from the walking state.

12. The mobile device of claim 11 wherein the processor compares a first amplitude of a first range of frequencies of the inertial signals to a second amplitude of a second range of frequencies of the inertial signals to determine whether the mobile device is being carried by a user who is walking.

13. The mobile device of claim 10 wherein the processor compares a first amplitude of a first range of frequencies of the inertial signals to a second amplitude of a second range of frequencies of the inertial signals to determine whether the mobile device is being carried by a user who is walking.

* * * * *